(12) United States Patent
Ogawa

(10) Patent No.: US 8,455,092 B2
(45) Date of Patent: *Jun. 4, 2013

(54) FLUORESCENT FINE PARTICLE FILMS

(75) Inventor: Kazufumi Ogawa, Awa (JP)

(73) Assignee: Empire Technology Development LLC, Wilmington, DE (US)

( * ) Notice: Subject to any disclaimer, the term of this patent is extended or adjusted under 35 U.S.C. 154(b) by 365 days.

This patent is subject to a terminal disclaimer.

(21) Appl. No.: 12/663,078

(22) PCT Filed: Jun. 5, 2008

(86) PCT No.: PCT/JP2008/060368
§ 371 (c)(1),
(2), (4) Date: Dec. 4, 2009

(87) PCT Pub. No.: WO2008/149934
PCT Pub. Date: Dec. 11, 2008

(65) Prior Publication Data
US 2010/0183880 A1    Jul. 22, 2010

(30) Foreign Application Priority Data
Jun. 6, 2007 (JP) .................. 2007-150835

(51) Int. Cl.
*B32B 5/16* (2006.01)

(52) U.S. Cl.
USPC ........... 428/323; 428/328; 428/402; 428/403; 428/404

(58) Field of Classification Search
USPC .................. 428/323, 402, 403, 404, 328
See application file for complete search history.

(56) References Cited

U.S. PATENT DOCUMENTS

| 2003/0099859 A1 * | 5/2003 | Liu et al. ............... 428/690 |
| 2010/0178473 A1 * | 7/2010 | Ogawa ................ 428/195.1 |
| 2011/0014416 A1 * | 1/2011 | Ogawa ................... 428/98 |

FOREIGN PATENT DOCUMENTS

| JP | 08053666 | | 2/1996 |
| JP | 2001-226669 | | 8/2001 |
| JP | 2003-168606 | | 6/2003 |
| JP | 2005-158634 | | 6/2005 |
| JP | 2006-8454 | * | 1/2006 |
| JP | 2006-008454 | | 1/2006 |
| JP | 2007-117827 | * | 5/2007 |
| JP | 2007-118276 | * | 5/2007 |
| JP | 2007-119545 | * | 5/2007 |
| JP | 2007-126332 | | 5/2007 |

OTHER PUBLICATIONS

International Search Report with Written Opinion for International Application No. PCT/JP2008/060365 mailed Sep. 16, 2008.
International Search Report and Written Opinion for International Patent Application No. PCT/JP2008/060397 mailed Aug. 26, 2008.
International Search Report with Written Opinion for International Application No. PCT/JP2008/060368 mailed Sep. 16, 2008.
U.S. Appl. No. 12/663,060, mailed Nov. 8, 2012, Office Action.
U.S. Appl. No. 12/663,060, mailed Feb. 25, 2013, Office Action.
U.S. Appl. No. 12/663,082, mailed Mar. 6, 2013, Restriction Requirement.

* cited by examiner

Primary Examiner — Leszek Kiliman
(74) Attorney, Agent, or Firm — Workman Nydegger

(57) ABSTRACT

A fluorescent fine particle film that retains the intrinsic functions of fluorescent fine particles and that can be formed on any substrate at a desired thickness, a method for manufacturing the fluorescent fine particle film, and a display apparatus, a photoconductor, and a sensor each including the fluorescent fine particle film are provided.

13 Claims, 5 Drawing Sheets

(A)

(B)

(A)

(B)

FLUORESCENT FINE PARTICLE FILMS

BACKGROUND

Fluorescent paste has been widely used in the manufacture of a fluorescent fine particle film for use in display apparatuses, such as cathode-ray tubes (CRTs) and plasma display panels (PDPs), illuminators, such as fluorescent lamps, X-ray intensifying screens, and luminous substances.

Fluorescent paste contains fluorescent fine particles, a solvent, and a binder resin. After the fluorescent paste is applied to a substrate, and the solvent is removed, a fluorescent fine particle film is formed by sintering (see, for example, Patent Document 1) or curing of the binder resin (see, for example, Patent Document 2).

[Patent Document 1] Japanese Unexamined Patent Application Publication No. 2001-226669.

[Patent Document 2] U.S. Patent Application Publication No. 2003/0099859.

However, as in a light-emitting diode described in Patent Document 2, the remaining binder resin in a fluorescent fine particle film reduces the proportion of fluorescent fine particles, thus lowering the luminous efficiency. As in Patent Document 1, when a fluorescent fine particle film is formed by sintering, although the density of fluorescent fine particles in the fluorescent film can be high, the manufacturing efficiency is low, and the substrate requires heat resistance.

Furthermore, in conventional methods using fluorescent paste, it is difficult to control the thickness of a fluorescent fine particle film at a fluorescent fine particle size level.

Accordingly, it would be beneficial to have a fluorescent fine particle film that retains the intrinsic functions of fluorescent fine particles and that can be formed on any substrate at a desired thickness, a method for manufacturing the fluorescent fine particle film, and a display apparatus, a photoconductor, and a sensor each including the fluorescent fine particle film.

SUMMARY

A fluorescent fine particle film, a method for manufacturing the fluorescent fine particle film, and a display apparatus, a photoconductor, and a sensor each including the fluorescent fine particle film are described.

In a fluorescent fine particle film, fluorescent fine particles each coated with a film formed of a second film compound having a second functional group are arranged on a substrate coated with a film formed of a first film compound having a first functional group to form a fluorescent fine particle layer. The coated fluorescent fine particles are fixed on the coated substrate through bonds formed by coupling reactions between a first coupling agent and the first and second functional groups. The first coupling agent has at least one first coupling group and at least one second coupling group. The first coupling group is coupled with the corresponding first functional group, and the second coupling group is coupled with the corresponding second functional group.

The term "coupling reaction", as used herein, refers to any reaction resulting from an addition reaction or a condensation reaction between functional groups and may be a thermal reaction or a photoreaction.

In the fluorescent fine particle film, the film formed of the first film compound disposed on the substrate may be further coated with a film formed of the first coupling agent bound by a coupling reaction between the first functional group and the first coupling group.

In the fluorescent fine particle film, the film formed of the second film compound disposed on the surface of the corresponding fluorescent fine particle may be further coated with a film formed of the first coupling agent bound by a coupling reaction between the second functional group and the second coupling group.

In the fluorescent fine particle film, the first film compound can be identical with the second film compound.

In the fluorescent fine particle film, one or both of the film formed of the first film compound and the film formed of the second film compound can be monomolecular films.

In the fluorescent fine particle film, a first sublayer to an n-th sublayer (n is an integer of 2 or more) of a laminated fluorescent fine particle layer may be disposed on the coated substrate in this order. Each surface of the fluorescent fine particles of odd-numbered fluorescent fine particle sublayers may be coated with the film formed of the second film compound. Each surface of the fluorescent fine particles of even-numbered fluorescent fine particle sublayers may be coated with a film formed of a third film compound having a third functional group, and the film formed of the third film compound may be coated with a film formed of a second coupling agent having at least one second coupling group and at least one third coupling group. The third coupling group is coupled with the third functional group to form a bond. The fluorescent fine particle sublayers may be bound to each other through a bond formed by a coupling reaction between the second functional group and the second coupling group and a bond formed by a coupling reaction between the third functional group and the third coupling group.

In this case, the first to third film compounds can be identical with one another, and the first and second coupling agents can be identical with each other. The films formed of the first to third film compounds can be monomolecular films.

In the fluorescent fine particle film, a first sublayer to an n-th sublayer (n is an integer of 2 or more) of a laminated fluorescent fine particle layer may be disposed on the coated substrate in this order. Each surface of the fluorescent fine particles of odd-numbered fluorescent fine particle sublayers may be coated with the film formed of the second film compound, and the film formed of the second film compound may be coated with the film formed of the first coupling agent. Each surface of the fluorescent fine particles of even-numbered fluorescent fine particle sublayers may be coated with a film formed of a third film compound having a third functional group. The fluorescent fine particle sublayers may be bound to each other through a bond formed by a coupling reaction between the second functional group and the second coupling group and a bond formed by a coupling reaction between the third functional group and the first coupling group.

In this case, the first to third film compounds can be identical with one another. The films formed of the first to third film compounds can be monomolecular films.

In the fluorescent fine particle film, the bonds formed by the coupling reactions may be N—$CH_2CH(OH)$ bonds formed by a reaction between an amino or imino group and an epoxy group.

In the fluorescent fine particle film, the bonds formed by the coupling reactions may be NH—CONH bonds formed by a reaction between an amino or imino group and an isocyanate group.

A method for manufacturing a fluorescent fine particle film, in which fluorescent fine particles each coated with a film formed of a second film compound having a second functional group and a second bonding group at opposite ends of a molecule of the second film compound are arranged on a substrate coated with a film formed of a first film compound having a first functional group and a first bonding group at opposite ends of a molecule of the first film compound to form a fluorescent fine particle layer, the method including the steps of: A) applying a solution containing the first film compound to the substrate to form a bond between the first bonding group and the substrate, thus preparing a coated substrate coated with a film formed of the first film compound; B) applying a solution containing the second film compound to the fluorescent fine particles to form a bond between the second bonding group and the surface of the corresponding fluorescent fine particle, thus preparing first coated fluorescent fine particles each coated with a film formed of the second film compound; and C) bringing a first coupling agent into contact with the coated substrate and the first coated fluorescent fine particles, the first coupling agent having at least one first coupling group that undergoes a coupling reaction with the first functional group to form a bond and at least one second coupling group that undergoes a coupling reaction with the second functional group to form a bond, thereby forming bonds by a coupling reaction between the first functional group and the first coupling group and a coupling reaction between the second functional group and the second coupling group to fix a fluorescent fine particle layer in which the first coated fluorescent fine particles are arranged to the coated substrate, and then removing unfixed first coated fluorescent fine particles.

In a method for manufacturing a fluorescent fine particle film, in step C, the first coupling agent may be applied to the coated substrate to prepare a reactive substrate having a film of the first coupling agent, and then the first coated fluorescent fine particles may be brought into contact with the reactive substrate to fix the first coated fluorescent fine particles on the reactive substrate.

In a method for manufacturing a fluorescent fine particle film, in step C, the first coupling agent may be applied to the first coated fluorescent fine particles to prepare first reactive fluorescent fine particles each having a film of the first coupling agent, and then the first reactive fluorescent fine particles may be brought into contact with the coated substrate to fix the first reactive fluorescent fine particles on the coated substrate.

In a method for manufacturing a fluorescent fine particle film, the first film compound can be identical with the second film compound.

In a method for manufacturing a fluorescent fine particle film, in steps A and B, unreacted portions of the first and second film compounds can be washed away, and the film formed of the first film compound on the coated substrate and the film formed of the second film compound on the first coated fluorescent fine particles are monomolecular films.

In a method for manufacturing a fluorescent fine particle film, a first sublayer to an n-th sublayer (n is an integer of 2 or more) of a laminated fluorescent fine particle layer can be disposed on the substrate in this order, the method may further includes the steps of: D) applying a solution containing a third film compound to the fluorescent fine particles, the third film compound having a third functional group and a third bonding group at opposite ends of a molecule of the third film compound, thereby forming a bond between the third bonding group and the corresponding fluorescent fine particle to coat second coated fluorescent fine particles with a film formed of the third film compound, and then applying a second coupling agent to the second coated fluorescent fine particles, the second coupling agent having the second coupling group and at least one third coupling group that undergo a coupling reaction with the third functional group to form a bond, thereby preparing second reactive fluorescent fine particles each having a film formed of the second coupling agent fixed thereon through a bond formed by a coupling reaction between the third functional group and the third coupling group; E) bringing the second reactive fluorescent fine particles into contact with a fluorescent fine particle sublayer of the first coated fluorescent fine particles disposed at a surface sublayer of the fluorescent fine particle layer to form a bond by a coupling reaction between the second functional group and the second coupling group, thereby fixing the second reactive fluorescent fine particles on the fluorescent fine particle sublayer of the first coated fluorescent fine particles, and then removing unfixed second reactive fluorescent fine particles; F) bringing the first coated fluorescent fine particles into contact with a fluorescent fine particle sublayer of the second reactive fluorescent fine particles disposed at a surface sublayer of the fluorescent fine particle layer to form a bond by a coupling reaction between the second functional group and the second coupling group, thereby fixing the first coated fluorescent fine particles on the fluorescent fine particle sublayer of the second reactive fluorescent fine particles, and then removing unfixed first coated fluorescent fine particles; and G) repeatedly performing the steps E and F in this order to form the fluorescent fine particle film composed of n fluorescent fine particle sublayers. Depending on the value of n, the step G may be completed by the step E or F.

In a method for manufacturing a fluorescent fine particle film, a first sublayer to an n-th sublayer (n is an integer of 2 or more) of a laminated fluorescent fine particle layer can be disposed on the substrate in this order, the method may further includes the steps of: D) applying a solution containing a third film compound to the fluorescent fine particles, the third film compound having a third functional group and a third bonding group at opposite ends of a molecule of the third film compound, thereby forming a bond between the third bonding group and the surface of the corresponding fluorescent fine particle to prepare second coated fluorescent fine particles each coated with a film formed of the third film compound; E) bringing the second coated fluorescent fine particles into contact with a fluorescent fine particle sublayer of the first reactive fluorescent fine particles to form a bond by a coupling reaction between the third functional group and the first coupling group, thereby fixing the second coated fluorescent fine particles on the fluorescent fine particle sublayer of the first reactive fluorescent fine particles, and then removing unfixed second coated fluorescent fine particles; F) bringing the first reactive fluorescent fine particles into contact with a fluorescent fine particle sublayer of the second coated fluorescent fine particles to form a bond by a coupling reaction between the third functional group and the first coupling group, thereby fixing the first reactive fluorescent fine particles on the fluorescent fine particle sublayer of the second coated fluorescent fine particles, and then removing unfixed first reactive fluorescent fine particles; and G) repeatedly performing the steps E and F in this order to form the fluorescent fine particle film composed of n fluorescent fine particle sublayers. Depending on the value of n, the step G may be completed by the step E or F.

In a method for manufacturing a fluorescent fine particle film, the first film compound can be identical with the second film compound.

In step D, an unreacted portion of the first film compound can be washed away, and the film formed of the first film compound on the second fluorescent fine particles is a monomolecular film.

In a method for manufacturing a fluorescent fine particle film, all the first and second film compounds or all the first to third film compounds may be alkoxysilane compounds, and the solutions containing the film compounds may further contain, as a condensation catalyst, at least one compound selected from the group consisting of carboxylic acid metal salts, carboxylate metal salts, carboxylic acid metal salt polymers, carboxylic acid metal salt chelates, titanates, and titanate chelates.

In a method for manufacturing a fluorescent fine particle film, all the first and second film compounds or all the first to third film compounds may be alkoxysilane compounds, and the solutions containing the film compounds may further contain, as a condensation catalyst, at least one compound selected from the group consisting of ketimine compounds, organic acids, aldimine compounds, enamine compounds, oxazolidine compounds, and aminoalkylalkoxysilane compounds.

In a method for manufacturing a fluorescent fine particle film, the solutions may further contain, as a promoter, at least one compound selected from the group consisting of ketimine compounds, organic acids, aldimine compounds, enamine compounds, oxazolidine compounds, and aminoalkylalkoxysilane compounds.

In a method for manufacturing a fluorescent fine particle film, the bonds formed by the coupling reactions may be N—$CH_2CH(OH)$ bonds formed by a reaction between an amino or imino group and an epoxy group.

In a method for manufacturing a fluorescent fine particle film, the bonds formed by the coupling reactions may be NH—CONH bonds formed by a reaction between an amino or imino group and an isocyanate group.

A display apparatus can include the fluorescent fine particle film.

A photoconductor can include the fluorescent fine particle film.

A sensor can include the fluorescent fine particle film.

A method for manufacturing a large-area insulating fluorescent fine particle film at low cost can be provided. The fluorescent fine particle film retains the intrinsic functions of fluorescent fine particles, can be formed on any substrate at a desired thickness, and has a uniform thickness and reduced variations in quality.

Furthermore, when a fluorescent fine particle layer in which fluorescent fine particles are arranged is fixed on a substrate, the fluorescent fine particle film has a high peel strength.

Furthermore, when a fluorescent fine particle film is formed by layer by layer through a bond formed by a coupling reaction, the thickness of the fluorescent fine particle film can be easily controlled at a fluorescent fine particle size level.

In a fluorescent fine particle film, when the surface of the film formed of the first film compound disposed on the substrate is further coated with the film formed of the first coupling agent, the fluorescent fine particles each coated with the film formed of the second film compound can be fixed on the surface of the substrate by a coupling reaction between the second functional group and the second coupling group without pretreatment of the fluorescent fine particles each coated with the film formed of the second film compound.

In a fluorescent fine particle film, when the surface of the film formed of the second film compound disposed on the fluorescent fine particles is further coated with the film formed of the second coupling agent, the fluorescent fine particles each coated with the film formed of the second film compound can be fixed on the surface of the substrate coated with the film formed of the first film compound by the coupling reaction between the first functional group and the first coupling group without pretreatment of the substrate coated with the film formed of the first film compound.

In a fluorescent fine particle film, when the first film compound is identical with the second film compound, the manufacturing costs can be reduced.

In a fluorescent fine particle film, when one or both of the films formed of the first and second film compounds are monomolecular films, the intrinsic physical properties and functions of one or both of the substrate and the fluorescent fine particles are maintained.

In a fluorescent fine particle film, three types of film compounds and two types of coupling agents can be used to manufacture a fluorescent fine particle film having a desired thickness.

In a fluorescent fine particle film, when the first to third film compounds are identical with one another, and the first and second coupling agents are identical with each other, the manufacturing costs can be further reduced.

In a fluorescent fine particle film, when all the films formed of the first to third film compounds are monomolecular films, the intrinsic physical properties and functions of the substrate and the fluorescent fine particles are maintained.

In a fluorescent fine particle film, three types of film compounds and one type of coupling agent can be used to manufacture a fluorescent fine particle film having a desired thickness.

In a fluorescent fine particle film, when the first to third film compounds are identical with one another, the manufacturing costs can be further reduced.

In a fluorescent fine particle film, when all the films formed of the first to third film compounds are monomolecular films, the intrinsic physical properties and functions of the substrate and the fluorescent fine particles are maintained.

In a fluorescent fine particle film, when the bonds formed by the coupling reactions are N—$CH_2CH(OH)$ bonds formed by a reaction between an amino or imino group and an epoxy group, a strong bond can be formed by heating.

In a fluorescent fine particle film, when the bonds formed by the coupling reactions are NH—CONH bonds formed by a reaction between an amino or imino group and an isocyanate group, a strong bond can be formed by heating.

In a method for manufacturing a fluorescent fine particle film, in step C, when the first coupling agent is applied to the coated substrate to prepare a reactive substrate having a film of the first coupling agent, the fluorescent fine particles each coated with the film formed of the second film compound can be fixed on the coated substrate by a coupling reaction between the second functional group and the second coupling group without pretreatment of the fluorescent fine particles each coated with the film formed of the second film compound.

In a method for manufacturing a fluorescent fine particle film, in the step C, when the first coupling agent is applied to the first coated fluorescent fine particles to prepare first reactive fluorescent fine particles each having a film of the first coupling agent, the fluorescent fine particles each coated with the film formed of the second film compound can be fixed on the substrate coated with the film formed of the first film compound by a coupling reaction between the first functional group and the first coupling group without pretreatment of the substrate coated with the film formed of the first film compound.

In a method for manufacturing a fluorescent fine particle film, when the first film compound is identical with the second film compound, the manufacturing costs can be reduced.

In a method for manufacturing a fluorescent fine particle film, when the films formed of the first and second film compounds are monomolecular films, the intrinsic physical properties and functions of the substrate and the fluorescent fine particles are maintained.

In a method for manufacturing a fluorescent fine particle film, when three types of film compounds and two types of coupling agents are used to manufacture a fluorescent fine particle film having a desired thickness, the manufacturing costs can be reduced.

In a method for manufacturing a fluorescent fine particle film, three types of film compounds and one type of coupling agent can be used to manufacture a fluorescent fine particle film having a desired thickness.

In a method for manufacturing a fluorescent fine particle film, when the same compound is used as the first to third film compounds, the manufacturing costs can be reduced greatly.

In a method for manufacturing a fluorescent fine particle film, when the film formed of the third film compound is a monomolecular film, the intrinsic physical properties and functions of the substrate and the fluorescent fine particles are maintained.

In a methods for manufacturing a fluorescent fine particle film, when the solutions containing the film compounds further contain, as a condensation catalyst, at least one compound selected from the group consisting of carboxylic acid metal salts, carboxylate metal salts, carboxylic acid metal salt polymers, carboxylic acid metal salt chelates, titanates, and titanate chelates, the preparation time of reactive fluorescent fine particles can be reduced, and thus the fluorescent fine particle film can be manufactured more efficiently.

In a method for manufacturing a fluorescent fine particle film, when the solutions containing the film compounds further contain at least one compound selected from the group consisting of ketimine compounds, organic acids, aldimine compounds, enamine compounds, oxazolidine compounds, and aminoalkylalkoxysilane compounds, the preparation time of reactive fluorescent fine particles can be reduced, and thus the fluorescent fine particle film can be manufactured more efficiently. In particular, when the solutions contain both these compounds and the above-mentioned condensation catalyst, the preparation time can be further reduced.

In a method for manufacturing a fluorescent fine particle film, when the bonds formed by the coupling reactions are N—$CH_2CH(OH)$ bonds formed by a reaction between an amino or imino group and an epoxy group, a strong bond can be formed by heating.

In a method for manufacturing a fluorescent fine particle film, when the bonds formed by the coupling reactions are NH—CONH bonds formed by a reaction between an amino or imino group and an isocyanate group, a strong bond can be formed by heating.

When a display apparatus includes the fluorescent fine particle films, the display apparatus can have uniform screen brightness. When a photoconductor and a sensor include the fluorescent fine particle films, they are highly sensitive and have uniform sensitivity over the entire photosensitive surface or sensing face.

DESCRIPTION OF DRAWINGS

FIG. 2(A) illustrates the cross-sectional structure of the glass substrate before a reaction, and FIG. 2(B) illustrates the cross-sectional structure of the glass substrate on which a monomolecular film of a film compound having an epoxy group is formed.

FIG. 3(A) illustrates the cross-sectional structure of a fluorescent zinc sulfide fine particle before a reaction, and FIG. 3(B) illustrates the cross-sectional structure of the fluorescent zinc sulfide fine particle on which a monomolecular film of a film compound having an epoxy group has been formed.

A fluorescent fine particle film 1 will be described below.

Figure 1:
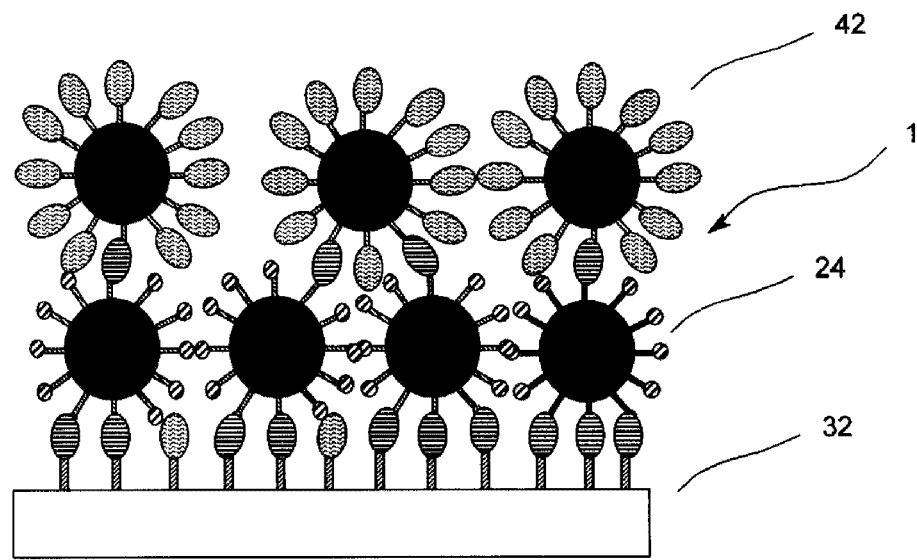
FIG. 1(A) is a schematic explanatory view of a cross-sectional structure of a fluorescent fine particle film.
FIG. 1(B) is a schematic explanatory view of a cross-sectional structure of a fluorescent fine particle film.
Figure 1:
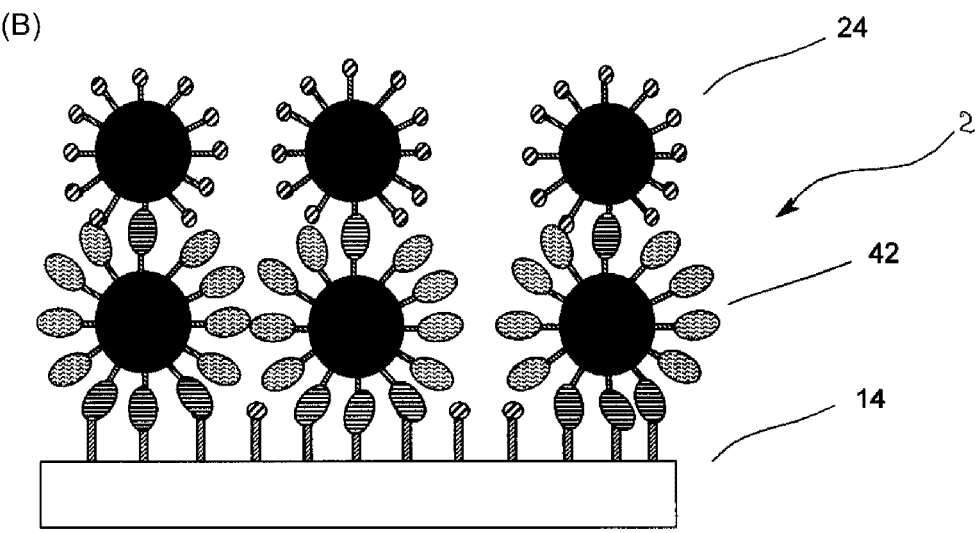
Figure 2:
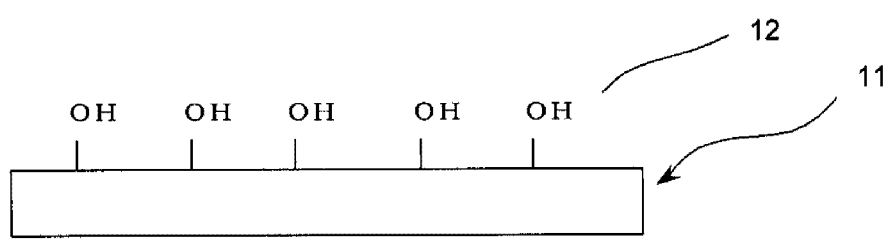
FIGS. 2(A) and 2(B) are schematic views to illustrate the step of manufacturing an epoxidized glass substrate in methods for manufacturing a fluorescent fine particle film according to the first and second embodiments.
Figure 2:
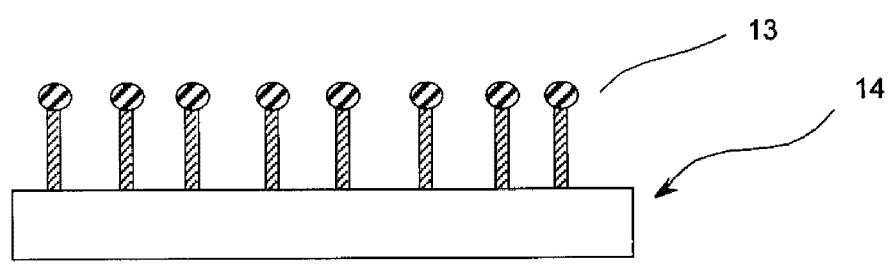
Figure 3:
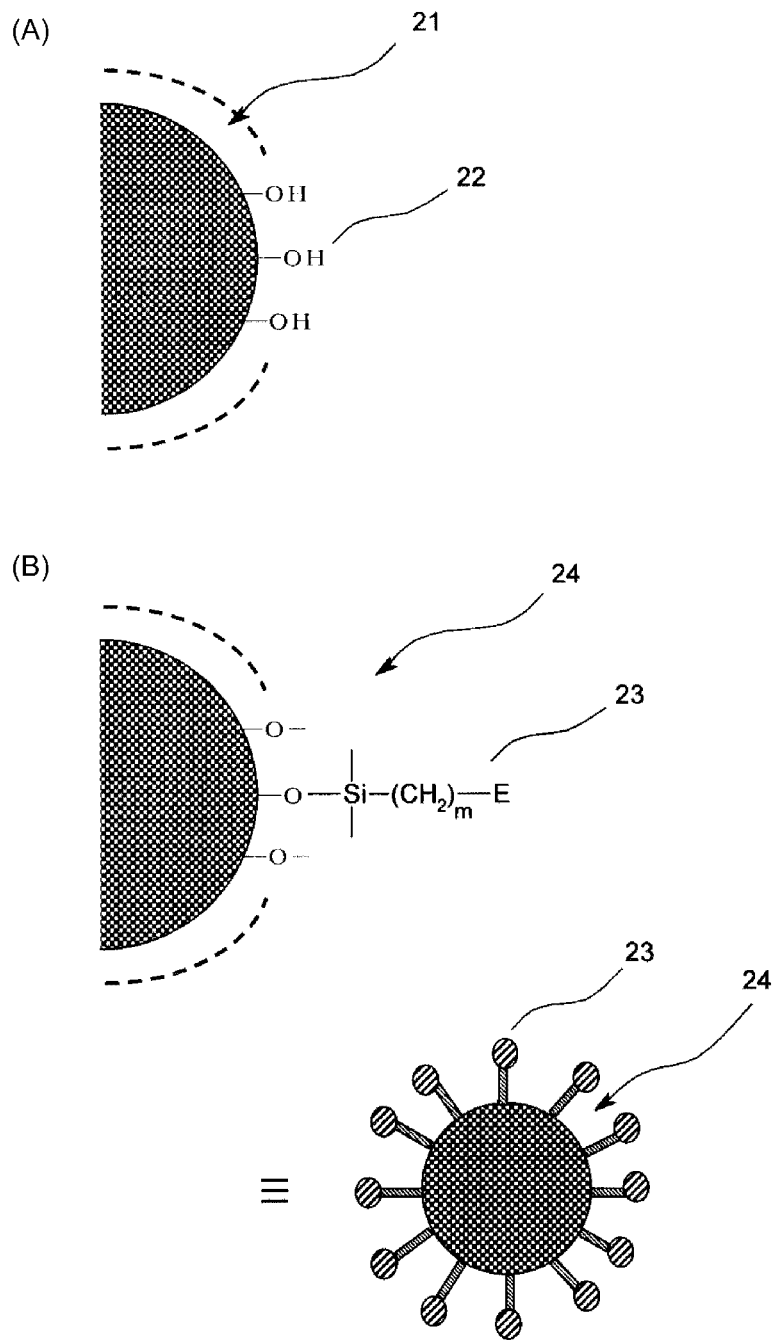
FIGS. 3(A) and 3(B) are schematic views to illustrate the step of manufacturing fluorescent epoxidized zinc sulfide fine particles in methods for manufacturing a fluorescent fine particle film according to the first and second embodiments.

As illustrated in FIGS. 1(A), 2, and 3, a fluorescent fine particle film 1 includes a fluorescent fine particle layer fixed on the surface of an epoxidized glass substrate 14, which is a glass substrate (an example of a substrate) 11 coated with a monomolecular film 13 of a film compound having an epoxy group, which is an example of a film formed of a first film compound having an epoxy group (an example of a first functional group). The fluorescent fine particle layer includes arranged fluorescent epoxidized zinc sulfide fine particles 24, which are fluorescent zinc sulfide fine particles (an example of fluorescent fine particles) coated with a monomolecular film 23 of a film compound having an epoxy group, which is an example of a film formed of a second film compound having an epoxy group (an example of a second functional group). The fluorescent epoxidized zinc sulfide fine particles 24 are fixed on the epoxidized glass substrate 14 through a bond formed by a coupling reaction between 2-methylimidazole (an example of a first coupling agent) having an amino group and an imino group (examples of first and second coupling groups), which undergo a coupling reaction with an epoxy group to form a bond, and epoxy groups located on the monomolecular films 13 and 23 of a film compound having an epoxy group. The monomolecular film 13 of a film compound having an epoxy group is further coated with a film formed of 2-methylimidazole bound by a coupling reaction between an epoxy group and an amino group of a 2-methylimidazole group, thus forming a reactive glass substrate (an example of a reactive substrate) 32. As illustrated in FIG. 1(A), a fluorescent fine particle layer in which fluorescent epoxidized zinc sulfide fine particles (an example of first coated fluorescent fine particles) 24 are arranged is fixed on the reactive glass substrate (an example of a reactive substrate) 32. The fluorescent fine particle layer is composed of a first sublayer to an n-th sublayer (n is an integer of 2 or more; in the present embodiment, n=2) disposed on the epoxidized glass substrate 14 in this order.

The reactive glass substrate 32 is coated with a monomolecular film 13 of a film compound (an example of a first film compound) having an epoxy group. The monomolecular film 13 is coated with a 2-methylimidazole film fixed thereon through a bond formed by a coupling reaction between an amino group (an example of a first coupling group) of 2-methylimidazole (an example of a first coupling agent) and an epoxy group.

The fluorescent epoxidized zinc sulfide fine particles 24 of a second fluorescent fine particle sublayer are coated with a 2-methylimidazole film fixed thereon through a bond formed by a coupling reaction between an amino group (an example of a third coupling group) of 2-methylimidazole (an example of a third coupling agent) and an epoxy group.

The reactive glass substrate 32 and fluorescent epoxidized zinc sulfide fine particles 24 of a first fluorescent fine particle sublayer, and fluorescent epoxidized zinc sulfide fine particles 24 of odd-numbered fluorescent fine particle sublayers and reactive fluorescent zinc sulfide fine particles 42 of even-numbered fluorescent fine particle sublayers are bound to each other through bonds formed by coupling reactions between an epoxy group and an amino or imino group of 2-methylimidazole.

As illustrated in FIGS. 2(A), 2(B), 3(A), 3(B), 4, and 5, a method for manufacturing a fluorescent fine particle film 1 includes the steps of: A) applying a solution containing an alkoxysilane compound (an example of a first film compound) having an epoxy group to a glass substrate (an example of a substrate) 11 to form a bond between an alkoxysilyl group (an example of a first bonding group) and the glass substrate 11, thereby preparing an epoxidized glass substrate 14 (an example of a coated substrate) (see FIG. 2); B) bringing an alkoxysilane compound (an example of a second film compound) having an epoxy group into contact with fluorescent zinc sulfide fine particles (an example of fluorescent fine particles) 21 to form a bond between an alkoxysilyl group (an example of a second bonding group) and the fluorescent zinc sulfide fine particles 21, thereby preparing fluorescent epoxidized zinc sulfide fine particles 24 (see FIG. 3); C) applying 2-methylimidazole to the epoxidized glass substrate 14 to cause a coupling reaction between an epoxy group and an amino group, thereby preparing a reactive glass substrate 32 (see FIG. 4), then bringing the fluorescent epoxidized zinc sulfide fine particles 24 into contact with the reactive glass substrate 32 to form a bond by a coupling reaction between an epoxy group and an imino group (an example of a second coupling group), thereby fixing the fluorescent epoxidized zinc sulfide fine particles 24 on the epoxidized glass substrate 14, and then removing unfixed fluorescent epoxidized zinc sulfide fine particles 24; D) applying a solution containing an epoxidized alkoxysilane compound (an example of a third film compound) to the fluorescent zinc sulfide fine particles 21 to form a bond between an alkoxysilyl group (an example of a third bonding group) and the fluorescent zinc sulfide fine particles 21, thereby preparing fluorescent epoxidized zinc sulfide fine particles (an example of second coated fluorescent fine particles) 24 (see FIG. 3), and then applying 2-methylimidazole (an example of a second coupling agent) to the fluorescent epoxidized zinc sulfide fine particles 24 to prepare reactive fluorescent zinc sulfide fine particles (an example of second reactive fluorescent fine particles) 42 each having a film formed of 2-methylimidazole fixed thereon through a bond formed by a coupling reaction between an epoxy group (an example of a third functional group) and an amino group (see FIG. 5); E) bringing the reactive fluorescent zinc sulfide fine particles 42 into contact with the fluorescent fine particle film 1 including a fluorescent fine particle sublayer of the fluorescent epoxidized zinc sulfide fine particles 24 to form a bond by a coupling reaction between an epoxy group and an imino group, thereby fixing the reactive fluorescent zinc sulfide fine particles 42 on the fluorescent fine particle sublayer of the fluorescent epoxidized zinc sulfide fine particles 24, and then removing unfixed reactive fluorescent zinc sulfide fine particles 42; and F) bringing the fluorescent epoxidized zinc sulfide fine particles 24 into contact with the fluorescent fine particle film 1 including the fluorescent fine particle sublayer of the reactive fluorescent zinc sulfide fine particles 42 to form a bond by a coupling reaction between an epoxy group and an imino group, thereby fixing the fluorescent epoxidized zinc sulfide fine particles 24 on the fluorescent fine particle sublayer of the reactive fluorescent zinc sulfide fine particles 42, and then removing unfixed fluorescent epoxidized zinc sulfide fine particles 24.

The steps A to F will be described in detail below.

In step A, a film compound having an epoxy group is brought into contact with a glass substrate 11 to produce an epoxidized glass substrate 14 coated with a monomolecular film 13 of a film compound having an epoxy group (FIG. 2).

The glass substrate 11 may be of any size.

The film compound having an epoxy group may be any compound that can be adsorbed on or bound to the surface of the glass substrate 11 to form a monomolecular film by self-organization. The film compound having an epoxy group is a straight-chain alkylene group having a functional group containing an epoxy group (oxirane ring) at one end and an alkoxysilyl group (an example of a first bonding group) at the other end, that is, an alkoxysilane compound having the following general formula (Chemical formula 1):

[Chemical formula 1]

wherein the functional group E can be a functional group having an epoxy group, m denotes an integer of 3 to 20, and R can be an alkyl group having 1 to 4 carbon atoms.

Specific examples of the film compound having an epoxy group include the following alkoxysilane compounds (1) to (12).

(1) $(CH_2OCH)CH_2O(CH_2)_3Si(OCH_3)_3$
(2) $(CH_2OCH)CH_2O(CH_2)_7Si(OCH_3)_3$
(3) $(CH_2OCH)CH_2O(CH_2)_{11}Si(OCH_3)_3$
(4) $(CH_2CHOCH(CH_2)_2)CH(CH_2)_2Si(OCH_3)_3$
(5) $(CH_2CHOCH(CH_2)_2)CH(CH_2)_4Si(OCH_3)_3$
(6) $(CH_2CHOCH(CH_2)_2)CH(CH_2)_6Si(OCH_3)_3$
(7) $(CH_2OCH)CH_2O(CH_2)_3Si(OC_2H_5)_3$
(8) $(CH_2OCH)CH_2O(CH_2)_7Si(OC_2H_5)_3$
(9) $(CH_2OCH)CH_2O(CH_2)_{11}Si(OC_2H_5)_3$
(10) $(CH_2CHOCH(CH_2)_2)CH(CH_2)_2Si(OC_2H_5)_3$
(11) $(CH_2CHOCH(CH_2)_2)CH(CH_2)_4Si(OC_2H_5)_3$
(12) $(CH_2CHOCH(CH_2)_2)CH(CH_2)_6Si(OC_2H_5)_3$

The $(CH_2OCH)CH_2O-$ group is a functional group represented by Chemical formula 2 (glycidyl group), and the $(CH_2CHOCH(CH_2)_2)CH-$ group is a functional group represented by Chemical formula 3 (3,4-epoxycyclohexyl group).

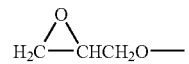

[Chemical formula 2]

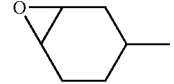

[Chemical formula 3]

The epoxidized glass substrate 14 is produced by reacting, at room temperature in the air, a reaction solution that contains an alkoxysilane compound having an epoxy group and an alkoxysilyl group (an example of a second bonding group), a condensation catalyst that promotes a condensation reaction between the alkoxysilyl group and a hydroxyl group 12 on a surface of the glass substrate 11, and a nonaqueous organic solvent, applied to the glass substrate 11. The reaction solution can be applied by any method, including a doctor blade method, a dip coating method, a spin coating method, a spray method, and a screen printing method.

Examples of the condensation catalyst include metal salts, such as carboxylic acid metal salts, carboxylate metal salts, carboxylic acid metal salt polymers, carboxylic acid metal salt chelates, titanates, and titanate chelates.

The amount of the condensation catalyst ranges from 0.2% to 5% by mass or 0.5% to 1% by mass of the alkoxysilane compound.

Specific examples of carboxylic acid metal salts include tin(II) acetate, dibutyltin dilaurate, dibutyltin dioctate, dibutyltin diacetate, dioctyltin dilaurate, dioctyltin dioctate, dioctyltin diacetate, tin(II) dioctanoate, lead naphthenate, cobalt naphthenate, and 2-ethylhexanoic acid iron salt.

Specific examples of carboxylate metal salts include a dioctyltin bis(octylthioglycolic acid ester) salt and a dioctyltin maleate salt.

Specific examples of carboxylic acid metal salt polymers include a dibutyltin maleate polymer and a dimethyltin mercaptopropionate polymer.

Specific examples of carboxylic acid metal salt chelates include dibutyltin bis(acetylacetate) and dioctyltin bis(acetyllaurate).

Specific examples of titanates include tetrabutyl titanate and tetranonyl titanate.

Specific examples of titanate chelates include bis(acetylacetonyl)dipropyl titanate.

The condensation reaction occurs between an alkoxysilyl group and a hydroxyl group 12 on the surface of the glass substrate 11, yielding the monomolecular film 13 of the film compound having an epoxy group having the structure represented by Chemical formula 4. Three single bonds of oxygen atoms are bound to the surface of the glass substrate 11 or a silicon (Si) atom of an adjacent silane compound. At least one of the three single bonds is bound to a silicon atom on the surface of the glass substrate 11.

[Chemical formula 4]

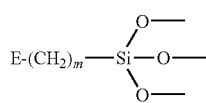

Since an alkoxysilyl group decomposes in the presence of water, the reaction is performed in the air at a relative humidity of 45% or less. The condensation reaction is inhibited by oil and fat or water on the surface of the glass substrate 11. Thus, the glass substrate 11 can be previously washed and dried to remove these impurities.

In the presence of any of the metal salt condensation catalysts described above, the condensation reaction time is about two hours.

In place of the above-mentioned metal salt, in the presence of at least one compound selected from the group consisting of ketimine compounds, organic acids, aldimine compounds, enamine compounds, oxazolidine compounds, and aminoalkylalkoxysilane compounds used as a condensation catalyst, the reaction time can be reduced to half to two thirds.

Using these compounds as promoters, together with the metal salt described above (at a mass ratio in the range of 1:9 to 9:1, or about 1:1), the reaction time can be further reduced.

For example, using a ketimine compound H3 from Japan Epoxy Resins Co., Ltd. in place of a carboxylic acid metal salt chelate dibutyltin bis(acetylacetate) as a condensation catalyst under the same conditions in the manufacture of fluorescent epoxidized zinc sulfide fine particles 21, the reaction time can be reduced to about one hour without compromising the quality of the fluorescent epoxidized zinc sulfide fine particles 21.

Furthermore, using a mixture (at a mixture ratio of 1:1) of H3 from Japan Epoxy Resins Co., Ltd. and dibutyltin bis(acetylacetonate) as a condensation catalyst under the same conditions in the manufacture of fluorescent epoxidized zinc sulfide fine particles 21, the reaction time can be reduced to about 20 min.

The ketimine compound used herein may be, but not limited to 2,5,8-triaza-1,8-nonadiene, 3,11-dimethyl-4,7,10-triaza-3,10-tridecadiene, 2,10-dimethyl-3,6,9-triaza-2,9-undecadiene, 2,4,12,14-tetramethyl-5,8,11-triaza-4,11-pentadecadiene, 2,4,15,17-tetramethyl-5,8,11,14-tetraaza-4,14-octadecadiene, or 2,4,20,22-tetramethyl-5,12,19-triaza-4,19-trieicosadiene.

The organic acid used herein may be, but not limited to, formic acid, acetic acid, propionic acid, butyric acid, or malonic acid.

The reaction solution may be manufactured using an organochlorine solvent, a hydrocarbon solvent, a fluorocarbon solvent, a silicone solvent, and a mixed solvent thereof. The solvent is dried with a drying agent or by distillation to prevent hydrolysis of an alkoxysilane compound. The solvent has a boiling point in the range of 50° C. to 250° C.

Specific examples of the solvent include nonaqueous petroleum naphtha, solvent naphtha, petroleum ether, petroleum benzine, isoparaffin, normal paraffin, decalin, industrial gasoline, nonane, decane, kerosene, dimethyl silicone, phenyl silicone, alkyl-modified silicone, polyether silicone, and dimethylformamide.

Additional examples of the solvent include alcohol solvents, such as methanol, ethanol, and propanol, and mixtures thereof.

Examples of the fluorocarbon solvent include chlorofluorocarbon solvents, Fluorinert (from 3M Co., USA) and Afluid (from Asahi Glass Co., Ltd.). These fluorocarbon solvents may be used alone or may be combinations of at least two miscible ones. Furthermore, an organochlorine solvent, such as dichloromethane or chloroform, may be added.

The concentration of the alkoxysilane compound in the reaction solution ranges from 0.5% to 3% by mass.

After the reaction, the glass substrate 11 is washed with a solvent to remove an unreacted portion of the alkoxysilane compound and the condensation catalyst, thus producing an epoxidized glass substrate 14 coated with the monomolecular film 13 of a film compound having an epoxy group. FIG. 2(B) is a schematic view of the cross-sectional structure of the epoxidized glass substrate 14 thus produced.

The washing solvent may be any solvent that can dissolve the alkoxysilane compound. The washing solvent can be dichloromethane, chloroform, or N-methylpyrrolidone because these solvents are inexpensive, highly soluble, and easy to remove by air drying.

If the epoxidized glass substrate 14 is not washed with a solvent and is left in the air after the reaction, part of the alkoxysilane compound remaining on the epoxidized glass substrate 14 is hydrolyzed by water in the air, and the resulting silanol group causes a condensation reaction with an alkoxysilyl group. This results in the formation of an ultrathin polysiloxane polymer film on the epoxidized glass substrate 14. Although this polymer film is not necessarily entirely fixed on the epoxidized glass substrate 14 by a covalent bond, the polymer film has an epoxy group and therefore has the same reactivity to the epoxidized glass substrate 14 as the monomolecular film 13 of a film compound having an epoxy group. Thus, even if the epoxidized glass substrate 14 is not washed with a solvent, there is no particular problem in the manufacturing process after the step C.

While an alkoxysilane compound having an epoxy group is used in the present embodiment, a straight-chain alkylene group having an amino group at one end and an alkoxysilyl group at the other end, that is, an alkoxysilane compound represented by the following general formula (Chemical formula 5) may be used.

The coupling agent that reacts with an amino group may be a coupling agent having a glycidyl group at both ends.

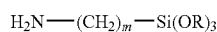

[Chemical formula 5]

In Chemical formula 5, m denotes an integer of 3 to 20, and R denotes an alkyl group having 1 to 4 carbon atoms.

Specific examples of the film compound having an amino group include the following alkoxysilane compounds (21) to (28).

(21) $H_2N(CH_2)_3Si(OCH_3)_3$
(22) $H_2N(CH_2)_5Si(OCH_3)_3$
(23) $H_2N(CH_2)_7Si(OCH_3)_3$
(24) $H_2N(CH_2)_9Si(OCH_3)_3$
(25) $H_2N(CH_2)_3Si(OC_2H_5)_3$
(26) $H_2N(CH_2)_5Si(OC_2H_5)_3$
(27) $H_2N(CH_2)_7Si(OC_2H_5)_3$
(28) $H_2N(CH_2)_9Si(OC_2H_5)_3$

However, in this case, among the condensation catalysts used in the reaction solution, compounds containing a tin(Sn) salt react with an amino group and form a precipitate. Thus, these compounds cannot be used as condensation catalysts for alkoxysilane compounds having an amino group.

When an alkoxysilane compound having an amino group is used, therefore, the same compounds as in the case of the alkoxysilane compounds having an epoxy group other than carboxylic acid tin salts, carboxylate tin salts, carboxylic acid tin salt polymers, and carboxylic acid tin salt chelates can be used alone or in combination as condensation catalysts.

The type of promoter, the combination of promoters, the type of solvent, the concentrations of the alkoxysilane compound, the condensation catalyst, and the promoter, the reaction conditions, and the reaction time are the same as in the alkoxysilane compounds having an epoxy group and will not be further described.

While the glass substrate is used as a substrate in the present embodiment, when a substrate has an active hydrogen group, such as a hydroxyl group or an amino group, on the surface, the film compound may be an alkoxysilane compound. Specific examples of such a substrate include ceramics, porcelain enamel, transparent electrodes, such as indium tin oxide (ITO), aluminum sheets, copper sheets, aluminum sheets, and metal sheets, such as silicon wafers.

When a synthetic resin is used as the substrate material, grafting of a compound having an active hydrogen group by plasma processing may be performed to use an alkoxysilane compound as the film compound.

While the silane compound that undergoes a condensation reaction with an active hydrogen group on the surface of the substrate is used as the film compound in the present embodiment, when a substrate having a gold plating layer is used, a thiol or triazinethiol derivative that forms a strong bond with a gold atom may be used as the film compound.

In step B, the same film compound having an epoxy group as used in step A is brought into contact with the fluorescent zinc sulfide fine particles 21 to produce fluorescent epoxidized zinc sulfide fine particles 24 coated with the monomolecular film 23 of the film compound having an epoxy group (See FIG. 3).

The size of the fluorescent zinc sulfide fine particles 21 is not limited and can range from 10 nm to 0.1 mm. Fluorescent zinc sulfide fine particles 21 having a size below 10 nm are significantly affected by the molecular size of the film compound. Fluorescent zinc sulfide fine particles 21 having a size above 0.1 mm have a high mass to surface area ratio and therefore the crosslinking reaction cannot support the mass.

The fluorescent epoxidized zinc sulfide fine particles 24 can be produced by reacting, at room temperature in the air, the fluorescent zinc sulfide fine particles 21 dispersed in a reaction solution that contains an alkoxysilane compound having an epoxy group, a condensation catalyst that promotes a condensation reaction between an alkoxysilyl group and a hydroxyl group 22 on the surface of the corresponding fluorescent zinc sulfide fine particle 21, and a nonaqueous organic solvent.

The type of alkoxysilane compound having an epoxy group, the condensation catalyst, the type of promoter, the combination of promoters, the type of solvent, the concentrations of the alkoxysilane compound, the condensation catalyst, and the promoter, the reaction conditions, and the reaction time in step B are the same as in step A and will not be further described.

After the reaction, the fluorescent zinc sulfide fine particles 21 are washed with a solvent to remove an unreacted portion of the alkoxysilane compound and the condensation catalyst, thus producing fluorescent epoxidized zinc sulfide fine particles 24 coated with the monomolecular film 23 of a film compound having an epoxy group. FIG. 3(B) is a schematic view of the cross-sectional structure of the fluorescent epoxidized zinc sulfide fine particles 24 thus produced.

The washing solvent may be the same as in step A.

If the fluorescent epoxidized zinc sulfide fine particles 24 are not washed with a solvent and are left in the air after the reaction, part of the alkoxysilane compound remaining on the fluorescent epoxidized zinc sulfide fine particles 24 is hydrolyzed by water in the air, and the resulting silanol group causes a condensation reaction with an alkoxysilyl group. This results in the formation of an ultrathin polysiloxane polymer film on the fluorescent epoxidized zinc sulfide fine particles 24. Although this polymer film is not fixed on the fluorescent epoxidized zinc sulfide fine particles 24 by a covalent bond, the polymer film has an epoxy group and therefore has the same reactivity to the fluorescent epoxidized zinc sulfide fine particles 24 as the monomolecular film 23 of a film compound having an epoxy group.

Thus, even if the epoxidized glass substrate 14 is not washed with a solvent, there is no particular problem in the manufacturing process after step C.

While an alkoxysilane compound having an epoxy group is used in the present embodiment, an alkoxysilane compound in which a straight-chain alkylene group has an amino group at one end and an alkoxysilyl group at the other end may be used, as in step A.

Furthermore, while the same alkoxysilane compound as in step A is used in the present embodiment, a different alkoxysilane compound may be used, provided that the alkoxysilane compound has a functional group that reacts with a coupling group of the coupling agent used in step C to form a bond.

While the fluorescent cadmium sulfide fine particles are used as fluorescent fine particles in the present embodiment, other fluorescent fine particles may be used. Examples of the fluorescent fine particles include fluorescent substances for use in plasma displays in which an impurity, such as a rare earth or manganese, is added to a base material, such as an oxide, a phosphorylated compound, or a halide; fluorescent substances for use in CRTs, such as ZnS:Ag, Cl, ZnS:Cu, Au, Al, and $Y_2O_2S$:Eu; fluorescent substances for use in radioluminescence, such as NaI and ZnS; and fluorescent substances for use in electroluminescence (EL) in which copper halide, Mn, or a rare earth is added as an active ingredient to a base material, such as ZnS, ZnCdS, CaS, or ZnSe.

When fluorescent fine particles other than the fluorescent cadmium sulfide fine particles have an active hydrogen group, such as a hydroxyl group or an amino group, on the surface thereof, an alkoxysilane compound can also be used as a film compound, as in the fluorescent cadmium sulfide fine particles. For a fluorescent sulfide substance, an alkyl phosphine compound that can coordinate to a sulfur atom through a P—S bond may be used.

In the present embodiment, the film compounds having an epoxy group used as the first and second film compounds may be the same or different. The first and second film compounds may have different functional groups (for example, one has an epoxy group, and the other has an isocyanate group).

In step C, 2-methylimidazole is applied to the epoxidized glass substrate 14 to cause a coupling reaction between an epoxy group and an amino group, thereby preparing a reactive glass substrate 32, then the fluorescent epoxidized zinc sulfide fine particles 24 are brought into contact with the reactive glass substrate 32 to form a bond by a coupling reaction between an epoxy group and an imino group, thereby fixing the fluorescent epoxidized zinc sulfide fine particles 24 on the epoxidized glass substrate 14, and then unfixed fluorescent epoxidized zinc sulfide fine particles 24 are removed.

2-methylimidazole has an amino group at position 1 and an imino group at position 3. These groups undergo crosslinking reactions with epoxy groups to form bonds, as shown by the following Chemical formula 6.

[Chemical formula 6]

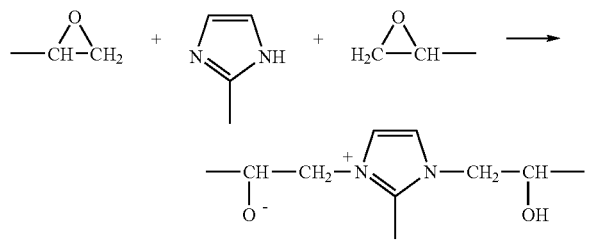

The reactive glass substrate 32 is produced by applying a reaction solution containing 2-methylimidazole and a solvent to the epoxidized glass substrate 14 and allowing 2-methylimidazole to react by heating. The reaction solution can be applied by any method, including a doctor blade method, a dip coating method, a spin coating method, a spray method, and a screen printing method.

In the manufacture of a film precursor, any solvent that dissolves 2-methylimidazole can be used. Lower alcohol solvents, such as isopropyl alcohol and ethanol, are beneficial in terms of cost, volatility at room temperature, and toxicity.

The amount of 2-methylimidazole, the concentration of the reaction solution, the reaction temperature, and the reaction time are appropriately determined on the basis of the types of the substrate and the fluorescent fine particles, the thickness of the fluorescent fine particle film, and other factors.

Figure 4:
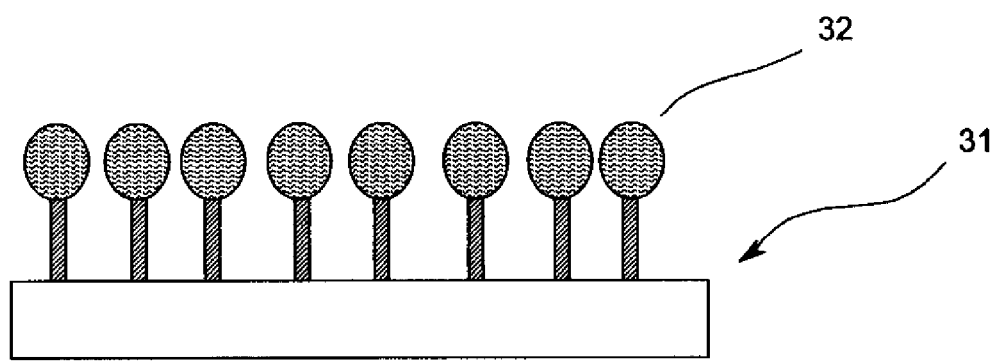
FIG. 4 is a schematic explanatory view of the cross-sectional structure of a reactive glass substrate having a 2-methylimidazole film fixed on the epoxidized glass substrate through a bond formed by a coupling reaction between an epoxy group and an amino group of 2-methylimidazole.

After the reaction, the epoxidized glass substrate 14 is washed with a solvent to remove unreacted 2-methylimidazole, thus producing a reactive glass substrate 32 coated with a reactive monomolecular film 31 (see FIG. 4).

A dispersion liquid of fluorescent epoxidized zinc sulfide fine particles 24 is applied to the reactive glass substrate 32 and is heated to cause a coupling reaction between an epoxy group on the fluorescent epoxidized zinc sulfide fine particles 21 and an imino group of 2-methylimidazole on the reactive monomolecular film 31, thereby fixing the fluorescent epoxidized zinc sulfide fine particles 24 on the surface of the reactive glass substrate 32. Thus, a fluorescent fine particle film 1 having a fluorescent fine particle monolayer is produced.

The heating temperature can range from 100° C. to 200° C. At a heating temperature below 100° C., the coupling reaction takes a long period of time. At a heating temperature above 200° C., the monomolecular film 23 having an epoxy group and the reactive monomolecular film 31 decompose, and therefore a uniform fluorescent fine particle film 1 cannot be formed.

After the reaction, the reactive glass substrate 32 is washed with a solvent, such as water or alcohol, to remove unreacted fluorescent epoxidized zinc sulfide fine particles 24.

While 2-methylimidazole is used as a coupling agent in the present embodiment, an imidazole derivative represented by the following Chemical formula 7 may be used.

[Chemical formula 7]

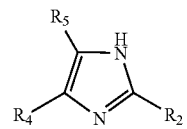

Specific examples of the imidazole derivative represented by Chemical formula 7 include the following imidazole derivatives (31) to (38).

(31) 2-methylimidazole ($R_2$=Me, $R_4$=$R_5$=H)
(32) 2-undecylimidazole ($R_2$=$C_{11}H_{23}$, $R_4$=$R_5$=H)
(33) 2-pentadecylimidazole ($R_2$=$C_{15}H_{31}$, $R_4$=$R_5$=H)
(34) 2-methyl-4-ethylimidazole ($R_2$=Me, $R_4$=Et, $R_5$=H)
(35) 2-phenylimidazole ($R_2$=Ph, $R_4$=$R_5$=H)
(36) 2-phenyl-4-ethylimidazole ($R_2$=Ph, $R_4$=Et, $R_5$=H)
(37) 2-phenyl-4-methyl-5-(hydroxymethyl)imidazole ($R_2$=Ph, $R_4$=Me, $R_5$=$CH_2OH$)
(38) 2-phenyl-4,5-bis(hydroxymethyl)imidazole ($R_2$=Ph, $R_4$=$R_5$=$CH_2OH$)

Me, Et, and Ph can be a methyl group, an ethyl group, and a phenyl group, respectively.

In addition to the imidazole derivatives, heterocyclic compounds containing at least two nitrogens, such as melamine, isocyanuric acid, triazine, barbituric acid, parabanic acid, uracil, and thymine, may be used. Imidazole-metal complexes may also be used.

A compound used as a curing agent for an epoxy resin, for example, an acid anhydride, such as phthalic anhydride or maleic anhydride, dicyandiamide, and a phenol derivative, such as novolak, may also be used as a coupling agent. In this case, an imidazole derivative may be used as a catalyst to promote the coupling reaction.

While the film compound has an epoxy group as a functional group in the present embodiment, when the film compound has an amino or imino group as a functional group, a coupling agent having two or more epoxy or isocyanate groups as coupling groups is used. Specific examples of the compound having isocyanate groups include hexamethylene-1,6-diisocyanate, toluene-2,6-diisocyanate, and toluene-2,4-diisocyanate.

The amounts of these diisocyanate compounds can range from 5% to 15% by weight of fluorescent epoxidized silica fine particles, as in the case of 2-methylimidazole. In this case, a solvent used in the manufacture of a film precursor may be an aromatic solvent, such as xylene.

When a film compound having an amino group is used, a compound having two or more epoxy groups, such as ethylene glycol diglycidyl ether, may also be used as a cross-linker.

Figure 5:
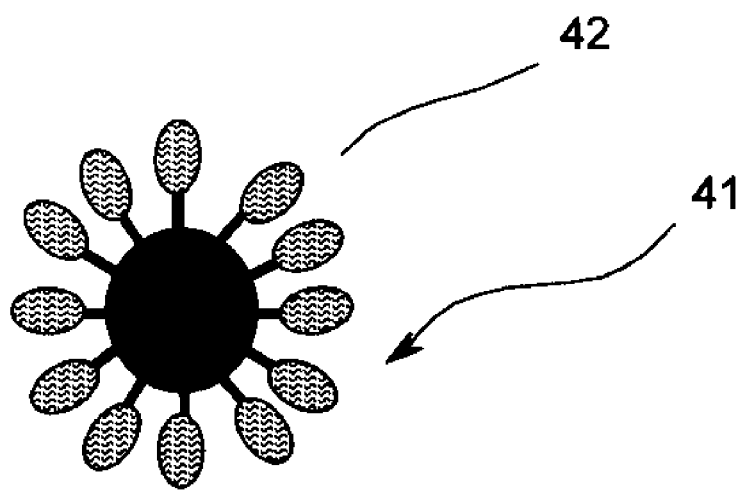
FIG. 5 is a schematic explanatory view of the cross-sectional structure of a reactive fluorescent zinc sulfide fine particle having a 2-methylimidazole film fixed on the fluorescent epoxidized zinc sulfide fine particle through a bond formed by a coupling reaction between an epoxy group and an amino group of 2-methylimidazole.

In step D, a solution containing an epoxidized alkoxysilane compound is applied to the fluorescent zinc sulfide fine particles 21 to form a bond between an alkoxysilyl group and the fluorescent zinc sulfide fine particles 21, thus preparing fluorescent epoxidized zinc sulfide fine particles 24, and then 2-methylimidazole is applied to the fluorescent epoxidized zinc sulfide fine particles 24 to prepare reactive fluorescent zinc sulfide fine particles 42 each having a film formed of 2-methylimidazole fixed thereon through a bond formed by a coupling reaction between an epoxy group and an amino group of 2-methylimidazole (FIG. 5).

The concentration of the 2-methylimidazole solution, the reaction conditions, and other factors are the same as in the preparation of the reactive glass substrate 32 in the step C, except that the fluorescent epoxidized zinc sulfide fine particles 24 are dispersed in a solution and heated, instead of applying the solution. Thus, these factors will not be further described. Other coupling agents that can be used are also the same as in the preparation of the reactive glass substrate 42 in step C.

In the present embodiment, the film compound having an epoxy group used as the third film compound may be the same as or different from one or both of the first and second film compounds. The third film compound may have a functional group different from those of the first and second film compounds (for example, an amino group).

In step E, the reactive fluorescent zinc sulfide fine particles 42 are brought into contact with the fluorescent fine particle film 1 having a fluorescent fine particle sublayer of the fluorescent epoxidized zinc sulfide fine particles 24 to form a bond by a coupling reaction between an epoxy group and an imino group, thereby fixing the reactive fluorescent zinc sulfide fine particles 42 on the fluorescent fine particle sublayer of the fluorescent epoxidized zinc sulfide fine particles 24, and then unfixed reactive fluorescent zinc sulfide fine particles 42 are removed.

In step F, the fluorescent epoxidized zinc sulfide fine particles 24 are brought into contact with the fluorescent fine particle film 1 having a fluorescent fine particle sublayer of reactive fluorescent zinc sulfide fine particles 42 to form a bond by a coupling reaction between an epoxy group and an imino group, thereby fixing the fluorescent epoxidized zinc sulfide fine particles 24 on the fluorescent fine particle sublayer of reactive fluorescent zinc sulfide fine particles 42, and then unfixed fluorescent epoxidized zinc sulfide fine particles 24 are removed.

The reaction conditions in steps E and F are the same as in step D and will not be further described.

In the present embodiment, while the preparation of a fluorescent fine particle film that includes two fluorescent fine particle sublayers has been described, step G in which the steps E and F are performed repeatedly to form a fluorescent fine particle film that includes n fluorescent fine particle sublayers (n is an integer of 2 or more) may be further performed. Depending on the value of n, the step G may be completed by the step E or F.

A fluorescent fine particle film 2 will be described below.

As illustrated in FIG. 1(B), in the fluorescent fine particle film 2, reactive fluorescent zinc sulfide fine particles 42 are arranged on an epoxidized glass substrate 14 to form a fluorescent fine particle layer. The fluorescent fine particle layer is composed of a first sublayer to an n-th sublayer (n is an integer of 2 or more; in the present embodiment, n=2) disposed on the epoxidized glass substrate 14 in this order.

The epoxidized glass substrate 14 is coated with a monomolecular film 13 of a film compound having an epoxy group.

Each surface of reactive fluorescent zinc sulfide fine particles 42 of a first fluorescent fine particle sublayer is further coated with a 2-methylimidazole film fixed thereof through a bond formed by a coupling reaction between an amino group of 2-methylimidazole and an epoxy group.

The epoxidized glass substrate 14 and the reactive fluorescent zinc sulfide fine particles 42 of the first fluorescent fine particle sublayer, and the reactive fluorescent zinc sulfide fine particles 42 of odd-numbered fluorescent fine particle sublayers and the fluorescent epoxidized zinc sulfide fine particles 24 of even-numbered fluorescent fine particle sublayers are bound to each other through bonds formed by coupling reactions between an epoxy group and an amino or imino group of 2-methylimidazole.

As illustrated in FIGS. 2(A), 2(B), 3(A), 3(B), and 5, a method for manufacturing a fluorescent fine particle film 2 includes the steps of: A) applying a solution containing an alkoxysilane compound having an epoxy group to a glass substrate 11 to form a bond between an alkoxysilyl group and the glass substrate 11, thereby preparing an epoxidized glass substrate 14; B) bringing an alkoxysilane compound having an epoxy group into contact with fluorescent zinc sulfide fine particles 21 to form a bond between an alkoxysilyl group and the fluorescent zinc sulfide fine particles 21, thereby preparing fluorescent epoxidized zinc sulfide fine particles 24; C) applying 2-methylimidazole to the fluorescent epoxidized zinc sulfide fine particles 24 to cause a coupling reaction between an epoxy group and an amino group, thereby preparing a reactive glass substrate 32, then bringing the reactive fluorescent zinc sulfide fine particles 42 into contact with the reactive glass substrate 32 to form a bond by a coupling reaction between an epoxy group and an imino group (an example of a second coupling group), thereby fixing the reactive fluorescent zinc sulfide fine particles 42 on the epoxidized glass substrate 14, and then removing unfixed reactive fluorescent zinc sulfide fine particles 42; D) applying a solution containing an epoxidized alkoxysilane compound to the fluorescent zinc sulfide fine particles 21 to form a bond between an alkoxysilyl group and the fluorescent zinc sulfide fine particles 21, thereby preparing fluorescent epoxidized zinc sulfide fine particles 24; E) bringing the fluorescent epoxidized zinc sulfide fine particles 24 into contact with the fluorescent fine particle film 1 having a fluorescent fine particle sublayer of reactive fluorescent zinc sulfide fine particles 42 to form a bond by a coupling reaction between an epoxy group and an imino group, thereby fixing the reactive fluorescent epoxidized zinc sulfide fine particles 24 on the fluorescent fine particle sublayer of reactive fluorescent zinc sulfide fine particles 42, and then removing unfixed fluorescent epoxidized zinc sulfide fine particles 24; and F) bringing the reactive fluorescent zinc sulfide fine particles 42 into contact with the fluorescent fine particle film 1 having a fluorescent fine particle sublayer of the fluorescent epoxidized zinc sulfide fine particles 24 to form a bond by a coupling reaction between an epoxy group and an imino group, thereby fixing the reactive fluorescent zinc sulfide fine particles 42 on the fluorescent fine particle sublayer of the fluorescent epoxidized zinc sulfide fine particles 24, and then removing unfixed reactive fluorescent zinc sulfide fine particles 42.

Preparation of the epoxidized glass substrate 14, the fluorescent epoxidized zinc sulfide fine particles 24, the reactive glass substrate 32, and the reactive fluorescent zinc sulfide fine particles 42, as well as the reactions thereof, in steps A to F, are the same as in the fluorescent fine particle film 1 according to the first embodiment and will not be further described.

The fluorescent fine particle film can be used in display apparatuses, such as displays and display boards, illuminators, such as fluorescent lamps, X-ray sensitive plates, photoconductors, such as electrophotographic image bars, and gas sensors.

EXAMPLES

Examples that were performed to investigate the operational advantage of the present fluorescent fine particle films will be described below.

Example 1

Preparation of Epoxidized Glass Substrate

A glass substrate was washed and dried completely.

0.99 parts by weight of 3-glycidyloxypropyltrimethoxysilane (Chemical formula 8, manufactured by Shin-Etsu Chemical Co., Ltd.) and 0.01 parts by weight of dibutyltin bis(acetylacetonate) (condensation catalyst) were dissolved in 100 parts by weight of hexamethyldisiloxane solvent to prepare a reaction solution.

[Chemical formula 8]

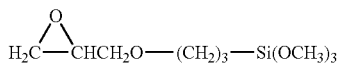

The reaction solution was applied to the glass substrate and was allowed to react in the air (at a relative humidity of 45%) for about two hours.

The glass substrate was then washed with chloroform to remove an unreacted portion of the alkoxysilane compound and dibutyltin bis(acetylacetonate).

Example 2

Preparation of Fluorescent Epoxidized Zinc Sulfide Fine Particles

Dry fluorescent zinc sulfide fine particles having a size of about 100 nm (Because the thickness of an insulating fluorescent fine particle film serving as a dielectric layer depends on this particle size, the fluorescent fine particles advantageously had a particle size distribution as narrow as possible.) were prepared and dried completely.

0.99 parts by weight of 3-glycidyloxypropyltrimethoxysilane (Chemical formula 8) and 0.01 parts by weight of dibutyltin bis(acetylacetonate) (condensation catalyst) were dissolved in 100 parts by weight of hexamethyldisiloxane solvent to prepare a reaction solution.

The reaction solution was mixed with the fluorescent zinc sulfide fine particles and was allowed to react in the air (at a relative humidity of 45%) for about two hours with stirring.

The fluorescent zinc sulfide fine particles were then washed with trichloroethylene to remove an unreacted portion of the alkoxysilane compound and dibutyltin bis(acetylacetonate).

Example 3

Preparation of Reactive Glass Substrate

A solution of 2-methylimidazole in ethanol was applied to the epoxidized glass substrate prepared in Example 1. Upon heating at 100° C., an amino group of 2-methylimidazole was allowed to react with an epoxy group to prepare a reactive glass substrate. The glass substrate was washed with ethanol to remove unreacted 2-methylimidazole.

Example 4

Preparation of Reactive Fluorescent Zinc Sulfide Fine Particles

The fluorescent epoxidized zinc sulfide fine particles prepared in Example 2 were dispersed in a solution of 2-methylimidazole in ethanol. Upon heating at 100° C., an amino group of 2-methylimidazole was allowed to react with an epoxy group to prepare a reactive glass substrate. The glass substrate was washed with ethanol to remove unreacted 2-methylimidazole.

Example 5

Preparation of Fluorescent Fine Particle Film (1)

An ethanol dispersion of the fluorescent epoxidized zinc sulfide fine particles prepared in Example 2 was applied to the reactive glass substrate prepared in Example 3 and was heated at 100° C. After the reaction, the glass substrate was washed with ethanol to remove unreacted fluorescent epoxidized zinc sulfide fine particles.

An ethanol dispersion of the reactive fluorescent zinc sulfide fine particles prepared in Example 4 was further applied to the fluorescent fine particle film including a fluorescent fine particle layer and was heated at 100° C. After the reaction, the fluorescent fine particle film was washed with ethanol to remove unreacted reactive fluorescent zinc sulfide fine particles, thus yielding a fluorescent fine particle film formed of two fluorescent fine particle sublayers.

Example 6

Preparation of Fluorescent Fine Particle Film (2)

An ethanol dispersion of the reactive fluorescent zinc sulfide fine particles prepared in Example 4 was applied to the epoxidized glass substrate prepared in Example 1 and was heated at 100° C. After the reaction, the glass substrate was washed with ethanol to remove unreacted reactive fluorescent zinc sulfide fine particles.

An ethanol dispersion of the fluorescent epoxidized zinc sulfide fine particles prepared in Example 2 was further applied to the fluorescent fine particle film including a fluorescent fine particle layer and was heated at 100° C. After the reaction, the fluorescent fine particle film was washed with ethanol to remove unreacted fluorescent epoxidized zinc sulfide fine particles, thus yielding a fluorescent fine particle film formed of two fluorescent fine particle sublayers.

REFERENCE NUMERALS 1 and 2 fluorescent fine particle film
11 glass substrate
12 hydroxyl group
13 monomolecular film of film compound having epoxy group
14 epoxidized glass substrate
21 fluorescent zinc sulfide fine particles
22 hydroxyl group
23 monomolecular film of film compound having epoxy group
24 fluorescent epoxidized zinc sulfide fine particles
31 reactive monomolecular film
32 reactive glass substrate
41 reactive monomolecular film
42 reactive fluorescent zinc sulfide fine particles

The invention claimed is:

1. A fluorescent film structure, comprising:
a substrate;
a plurality of first film compounds linked to the substrate to form a first film on the substrate, each first film compound including a first epoxide group;
a plurality of fluorescent particles;
a plurality of second film compounds linked to each of the fluorescent particles and configured to form a second film on each of the fluorescent particles, each second film compound including a second epoxide group; and
a plurality of crosslinking agents each having a plurality of crosslinking reaction groups including an imidazole group configured to link the first epoxide group of the first film compounds to the second epoxide group of the second film compounds to form the fluorescent film structure.

2. The fluorescent film structure of claim 1, further comprising:
a plurality of second fluorescent particles;
a plurality of third film compounds linked to the second particles so as to form a third film on the second particles and each third film compound including a third epoxide group and
a plurality of second crosslinking agents each having a plurality of crosslinking reaction groups including an imidazole group configured to link the second epoxide group of the second film compound to the third epoxide group of the third film compound to link the second fluorescent particle to the fluorescent particle linked to the substrate.

3. The fluorescent film structure of claim 2, wherein the substrate has n-layers of fluorescent particle films, where n is an integer greater than 2.

4. The fluorescent film structure of claim 3, wherein odd numbered layers of fluorescent particle films have second film compounds and even numbered layers of fluorescent particle films having third film compounds.

5. The fluorescent film structure of claim 4, wherein:
the first and second film compounds are the same;
the first, second and third film compounds are the same;
the first and third film compounds are the same; or
the second and third film compounds are the same.

6. The fluorescent film structure of claim 1, comprising:
the substrate having one or more first active hydrogen groups;
the first film compounds being first alkylsilane compounds that are linked to the substrate through the first active hydrogen group, said first alkylsilane compounds including the first epoxide group;
the fluorescent particles each having one or more second active hydrogen groups;
the second film compounds being second alkylsilane compounds linked to the particle through the second active hydrogen group, said second alkylsilane compounds including the second epoxide group; and
the crosslinking agents linking the first epoxide group of the first alkylsilane to the second epoxide group of the second alkylsilane.

7. The fluorescent film of claim 6, comprising:
the second fluorescent particle having one or more third active hydrogen groups;
the third film compounds being third alkylsilane compounds linked to the second fluorescent particle through the third active hydrogen group, said third alkylsilane compounds including a third epoxide group; and
the second crosslinking agent linking the second epoxide group of the second alkylsilane to the third epoxide group of the third alkylsilane.

8. The fluorescent film structure of claim 6, wherein the active hydrogen groups include hydroxyl groups or amino groups.

9. The fluorescent film structure of claim 6, wherein one or more of the alkylsilane compounds include the epoxy reactant product formed from reacting an epoxy group with the crosslinking agent.

10. A display device comprising the fluorescent film structure of claim 1.

11. A photoconductor comprising the fluorescent film structure of claim 1.

12. A sensor device comprising the fluorescent film structure of claim 1.

13. A device comprising:
a device configured as a display apparatus, a photoconductor, or a sensor;
a substrate of the device;
a plurality of first film compounds linked to the substrate so as to form a first film on the substrate and each first film compound including a first epoxide group;
a first fluorescent particle;
a plurality of second film compounds linked to the first particle so as to form a second film on the first particle and each second film compound including a second epoxide group; and
a plurality of first crosslinking agents each having a plurality of crosslinking reaction groups including an imidazole group and configured to link the first epoxide group of the first film compound to the second epoxide group of the second film compound to link the first fluorescent particle to the substrate.

* * * * *

UNITED STATES PATENT AND TRADEMARK OFFICE
CERTIFICATE OF CORRECTION

PATENT NO. : 8,455,092 B2  
APPLICATION NO. : 12/663078  
DATED : June 4, 2013  
INVENTOR(S) : Ogawa It is certified that error appears in the above-identified patent and that said Letters Patent is hereby corrected as shown below:

On the Title Page, in Item [56] under "FOREIGN PATENT DOCUMENTS", in Column 2, Line 6, delete "JP 2006-008454 1/2006".

In the Specification

In Column 12, Lines 9-10, delete "fluorescent epoxidized zinc sulfide fine particles 21," and insert -- fluorescent epoxidized zinc sulfide fine particles 24, --, therefor.

In Column 12, Lines 12-13, delete "fluorescent epoxidized zinc sulfide fine particles 21." and insert -- fluorescent epoxidized zinc sulfide fine particles 24. --, therefor.

In Column 12, Lines 17-18, delete "fluorescent epoxidized zinc sulfide fine particles 21," and insert -- fluorescent epoxidized zinc sulfide fine particles 24, --, therefor.

In Column 12, Line 21, delete "to" and insert -- to, --, therefor.

In Column 16, Lines 21-22, delete "fluorescent epoxidized zinc sulfide fine particles 21" and insert -- fluorescent epoxidized zinc sulfide fine particles 24 --, therefor.

In Column 17, Line 44, delete "reactive glass substrate 42" and insert -- reactive glass substrate 32 --, therefor.

In the Claims

In Column 21, Line 53, in Claim 2, delete "group and" and insert -- group; and --, therefor.

Signed and Sealed this  
Eleventh Day of February, 2014

Michelle K. Lee  
*Deputy Director of the United States Patent and Trademark Office*